(No Model.)
J. R. PERFATER.
NUT LOCK.
No. 536,892. Patented Apr. 2, 1895.
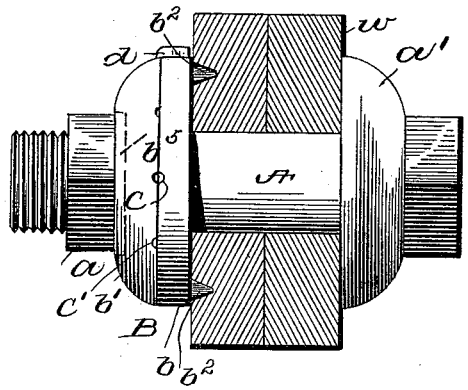
Fig. 1.
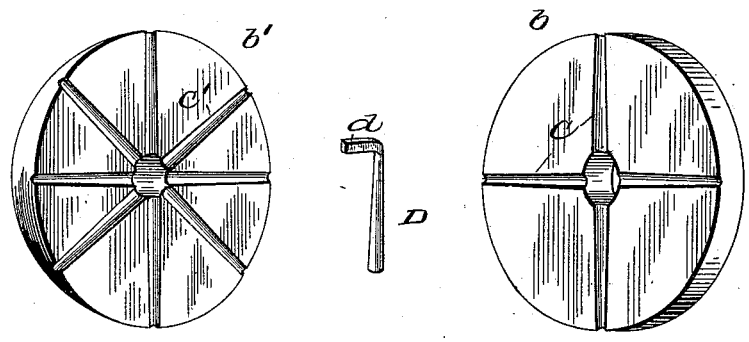
Fig. 2.
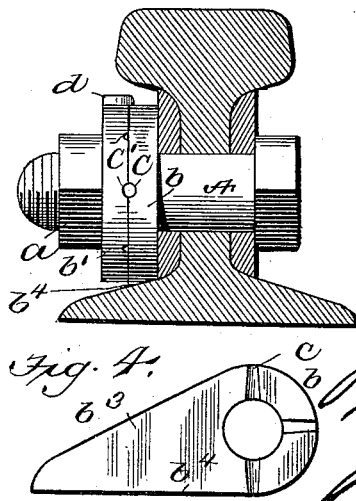
Fig. 3.
Fig. 4.
Witnesses
Inventor
Attorney.

UNITED STATES PATENT OFFICE.

JOHN R. PERFATER, OF CHRISTIANSBURG, VIRGINIA.

NUT-LOCK.

SPECIFICATION forming part of Letters Patent No. 536,892, dated April 2, 1895.

Application filed July 31, 1894. Serial No. 519,093. (No model.)

*To all whom it may concern:*

Be it known that I, JOHN R. PERFATER, of Christiansburg, in the county of Montgomery and State of Virginia, have invented certain new and useful Improvements in Nut-Locks; and I do hereby declare the following to be a full, clear, and exact description of the invention, such as will enable others skilled in the art to which it appertains to make and use the same.

This invention contemplates certain new and useful improvements in nut locks and has for its object the production of simple and highly efficient means whereby a nutted bolt can be firmly held in place as against accidental turning without requiring any special form of nut or bolt—that is, the object of this invention is to produce a simple device for locking a nut and threaded bolt so that the same can be prevented from accidental turning, said device being applicable to all forms of nuts and bolts now in general use, no alteration in the manufacture thereof being required. This I accomplish by providing two parts or members having central openings therein for the passage of the bolt, said parts or members being designed to be located on the bolt between the nut and the object to be secured, one of said parts or members engaging such object, and a key for locking both of said parts or members together after the nut has been screwed home. This key is made tapering and has an outer right-angular end. It fits in two coincident tapering grooves or recesses of the part or members, said grooves or recesses being larger at their inner than their outer end and semi-circular in cross-section. These tapering grooves or recesses are formed on the opposite faces of the parts or members, one of the parts or members being provided with twice as many grooves or recesses as the other.

To these ends the invention comprises the novel features of construction, and also the detail, combination and arrangement of parts, substantially as hereinafter fully set forth and particularly pointed out in the claim.

In the accompanying drawings:—Figure 1 is a view in side elevation showing my improved nut lock as used on a nutted bolt holding boards or beams united. Fig. 2 represents the several parts or sections of my improved nut-lock. Fig. 3 is a view similar to Fig. 1 showing my improved nut-lock as used with railroads rails and fish-plates. Fig. 4 is a view of one of the parts or sections of this latter form of nut lock detached.

Referring to the drawings, A designates the threaded bolt, and $a$ the nut designed to be screwed thereon, an ordinary washer $a'$ being preferably located between the head of the bolt and the board or beam $w$, or other object to be secured.

B designates my nut-lock which, as shown in Fig. 1, consists of two corresponding, preferably circular, parts or members $b$, $b'$, the former, $b$, being provided on its inner surface with two lugs or sharpened teeth $b^2$ which are designed to impinge or be forced into the side of one of the boards or beams to be secured. When used for connecting the fish-plates of railroad rails or other metallic structural beams, (see Fig. 3) this inner part or member has formed therewith a lateral arm $b^3$ which tapers on one edge and is flat on the other, as at $b^4$, the latter portion being designed to bear upon the lower flange of the rail or beam and thus hold said part or member against turning. The other part or member is provided on its outer surface with a square or other shaped groove or recess $b^5$ to accommodate the nut $a$. In the inner flat face of member $b$ are formed four, more or less, grooves or recesses C which radiate from the central opening in said member to the outer periphery thereof, said grooves or recesses being semi-circular in cross-section and tapered from end to end, that is, their inner ends are wider or larger than their outer ends. In the inner surface of the other member $b'$ are formed corresponding tapering radial grooves or recesses C', of which there are twice as many as are formed in the member $b$. When any two of these grooves or recesses of the two parts or members are brought coincident with each other a circular hole is formed wherein a tapering key D is designed to be inserted, said key having an outer angular end $d$ which limits the inward movement thereof and by means of which the key can be easily removed from or inserted in the hole or opening designed to receive the same. This key is preferably inserted into the hole formed by the coincident tapering grooves or recesses at the top of the two members $b$, $b'$, after the same have been firmly bound together by the nut being screwed home on the threaded end of the bolt. When this key is once inserted after the two members have thus been bound together the latter are held as against any accidental turning or loosening, the lugs or teeth of the inner member $b$ entering the boards or beams and serving to hold the parts firmly together. The tapering key serves as a wedge to further or additionally bind the parts or sections. In case the nut lock is used on railroad rails or other metallic structure, the contact of the lateral arm of the inner part or member with a projecting portion of such structure serves to firmly hold said inner part or member in position, while the key entering into the circular hole formed by the coincident grooves or recesses of the two parts or members locks the latter together and prevents any accidental turning of the nut.

The advantages of my invention are apparent to those skilled in the art and it will be seen that I have produced simple and highly efficient means for firmly and securely locking a nutted bolt, and also that no special form of nut or bolt is required. Hence my nut lock can be applied to all kinds of nutted bolts now in use and no special form of manufacture of such nuts or bolts is requisite, and the parts will be firmly and securely bound and held together as against any accidental turning or loosening.

I am aware that it is not broadly new to provide the opposite faces of two members of a nut-lock with coincident holes in which a pin is designed to be inserted; and also that corresponding dovetailed sockets have been formed in such members for reception of a double dovetailed key. Hence my invention is not designed to cover these features.

I claim as my invention—

The herein-described improved nut-lock consisting of two parts or members one of which has a projecting portion or portions and provided on its front face with a series of tapering grooves or recesses semi-circular in cross-section, the other of said parts or members having similar but a greater number of corresponding tapering grooves or recesses on its inner face, and a groove or recess on its outer surface to accommodate the nut, and a tapered or wedge-like rounded key having an outer bent or angular handle end, substantially as set forth, said key being designed to be inserted into any two of said tapering grooves or recesses of said parts or members when coincident with each other, said key being outwardly tapered to correspond to the taper of said grooves or recesses as stated.

In testimony whereof I have signed this specification in the presence of two subscribing witnesses.

JOHN R. PERFATER.

Witnesses:
  T. J. WHITE,
  C. W. MURDUCK.